Patented Oct. 16, 1945

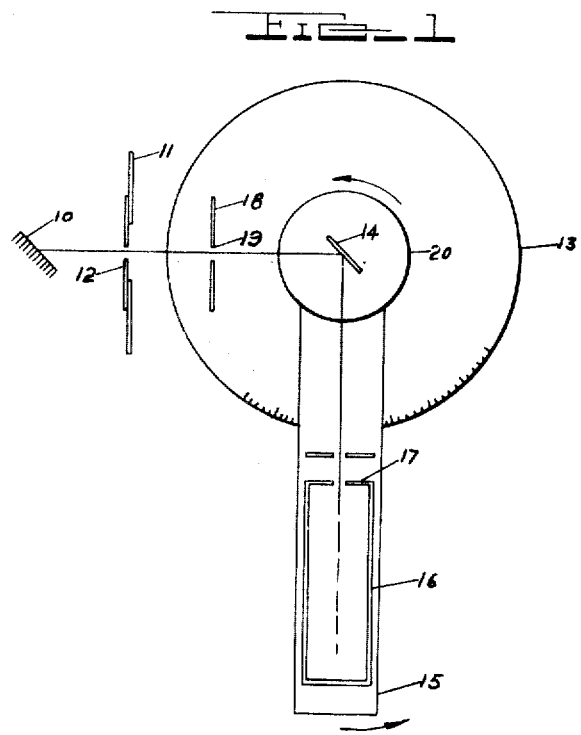
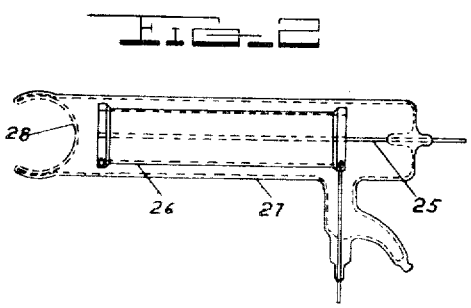

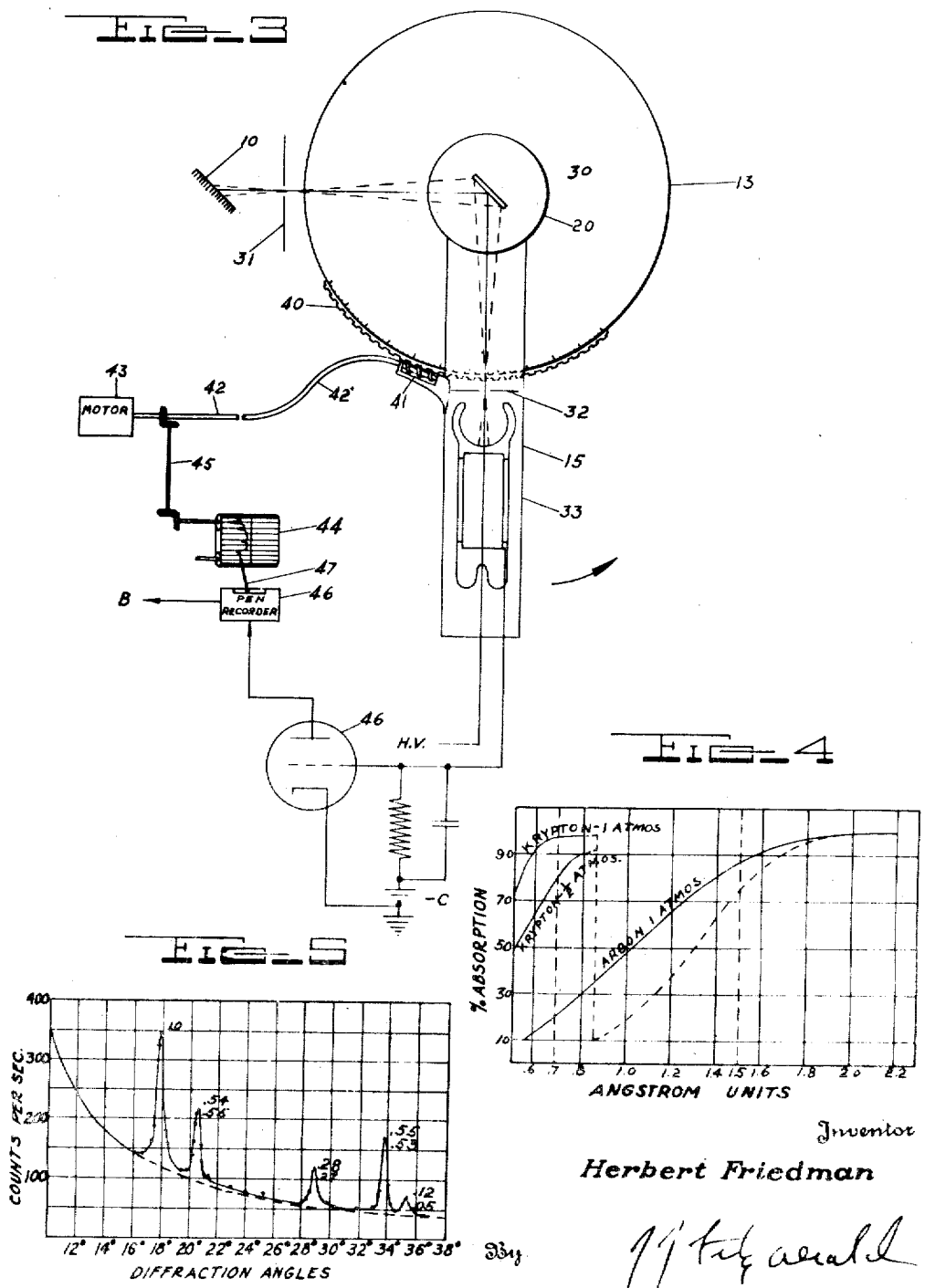

2,386,785

UNITED STATES PATENT OFFICE 2,386,785

METHOD AND MEANS FOR MEASURING X-RAY DIFFRACTION PATTERNS

Herbert Friedman, Washington, D. C.

Application July 28, 1942, Serial No. 452,599

16 Claims. (Cl. 250—83.6)

(Granted under the act of March 3, 1883, as amended April 30, 1928; 370 O. G. 757)

This invention relates to the measurement of X-ray diffraction patterns, being directed more particularly to a novel method for such measurement by the use of a Geiger-Muller counter and to a novel counter especially adapted to such use.

The conventional method for measuring the relative intensities of the various portions of an X-ray diffraction pattern involves the use of photographic film on to which the diffracted beam is directed for a period of time sufficient to cause film blackening, relative amounts of blackening of the various portions of the film constituting the measure of intensity of the beam components at those points.

In the past attempts have been made to utilize Geiger-Muller counters for diffraction measurements, but with very limited success, for reasons that will be pointed out hereinafter. In such attempts the quantum counting efficiencies realized were not over one or two per cent. On the other hand, however, the employment of this invention has resulted in efficiencies close to 100%. The photographic method of diffraction measurement consumes a considerable amount of time for each exposure and for the accurate measurement of very weak lines may consume several hours. The employment of the present invention has produced results comparable to those produced by the photographic method in 1/100 of the time. When studying a single line, the Geiger-Muller counter employed according to this invention possesses great superiority over film, especially if the line is changing in intensity and width during the time of measurement. With the counter, the changes in intensity and shape can be followed with little lag, at times when the photographic method may fail entirely.

It is an object of this invention to provide a method and means for measuring X-ray diffraction intensities which will greatly reduce the time required by previously known methods and equipment.

It is a further object to provide a method and means for measuring X-ray diffraction intensities which will produce indications of greater accuracy and with more clarity than is possible with previously known methods and equipment.

It is another object to provide a Geiger-Muller counter especially adapted to measurement of X-ray diffraction intensities which operates by the absorption of the rays in the gaseous filling rather than by impact with the tube cathode.

Other objects will become apparent from a careful consideration of the following description when taken together with the accompanying drawings in which:

Fig. 1 is a schematic showing of a conventional X-ray spectrometer employing an ionization chamber;

Fig. 2 is an elevational view of a Geiger-Muller counter constructed in accordance with the invention;

Fig. 3 is an elevational view, shown schematically, of a device adapted to carry out the method of the invention;

Fig. 4 is a graph showing the percentages of absorption of X-radiation by argon and krypton gases in a 10-centimeter counter at various gas pressures, and Fig. 5 is a graph illustrating a diffraction pattern obtained in the practice of the invention.

In Fig. 1 is illustrated the apparatus which was first used for measuring the intensity of an X-ray diffraction pattern. An X-ray target 10 is shown positioned near a plate 11 having formed therein an adjustable slit 12. Mounted upright on a specimen table 20 in the center of a circular spectrometer table 13 is a crystal 14 of the material to be studied. The crystal is so mounted that it may be rotated about an axis passing through the center of the table 13 and normal to its plane. An arm 15 extends radially from the axis and is mounted to rotate with the specimen table 20 carrying the crystal but to move through twice the angle of movement of table 20. Mounted on the arm 15 is an ionization chamber 16 having an aperture 17 in the end nearest the crystal. A plate 18 is adjustably mounted on the spectrometer table in such a position that a slit 19 formed therein may in cooperation with the slit 12 collimate the beam of X-rays from the X-ray target. A plate 22 with a slit 23 together with the aperture 17 performs the same function for the rays leaving the crystal. The spectrometer table 13 is formed with an azimuth scale on its periphery to indicate the angular position of the ionization chamber and the crystal.

In the use of this device the arm 15 and the specimen table 20 are moved through an arc of 90° at constant rates of speed and the instantaneous intensity indicated by the ionization chamber is recorded. The result is a diffraction pattern of the type illustrated in Fig. 4. Numerous conventional arrangements exist which may be employed to drive the arm and specimen table and synchronize the recording of intensities with the angular position of the arm.

This method of measuring diffraction intensities has been supplanted in recent years by the photographic method in which a film is substituted for the ionization chamber. The abandonment of the use of the ionization chamber for this purpose was necessitated by the considerable amount of error involved in its use. These errors arise from the fact that the currents derived from the ionization chamber are extremely minute and since they are of a direct current nature must be subject to a high order of D. C. amplification. It is extremely difficult to attain such amplification in a linear manner, the results being usually subject to an error known as drift. Furthermore, the background radiation is usually considerable and the response caused thereby is of such magnitude as to at times completely obliterate the response due to the diffraction spectrum being measured. The sum of these errors renders the results obtained by the use of the ionization chamber of doubtful value.

The use of film being subject to the undesirable features noted above, attempts have been made to supplant it by the use of a Geiger-Muller counter used as a substitute for the ionization chamber. However, all such previous attempts have been unsatisfactory since the efficiency of the counters as used was extremely small. The Geiger-Muller counter consists of a pair of electrodes, an anode and a cathode, enclosed in a glass envelope, the two electrodes being insulated from each other. The cathode is a cylinder, usually of copper, along the axis of which extends the anode in the form of a wire. These parts may be observed in Fig. 2 which shows applicant's Geiger-Muller counter comprising an anode wire 25 and a cylindrical cathode 26 enclosed in the glass envelope 27. In the counters used heretofore for this purpose the envelope contained a gas such as air, hydrogen, helium, and the rare gases, or a mixture of gases at a pressure of a few centimeters of mercury. When such gases are used the pressure is restricted to this level in order to avoid excessive threshold voltages. These gas fillings will not absorb a large fraction of the radiation passing through them, thus forcing reliance on the photoelectric effect of cathode impact. In previous attempts these counters were therefore invariably oriented in such a manner that the radiation impinged upon the cylindrical cathode, the counting action being due mainly to photoelectrons ejected from the wall by the impact of the radiation thereon, the gaseous absorption of the radiation being negligible. Under these conditions it has been shown that one cannot expect to obtain efficiencies above one or two per cent. Furthermore, with these gas fillings the counter has a slow counting action and is therefore very inefficient when attempts are made to measure radiation emitted at a high rate of recurrence such as is found in X-ray diffraction patterns.

The present invention involves a departure from this practice in two essential particulars, first in the manner which the counter is filled and constructed, and secondly, in the manner of its use. Referring again to Fig. 2; according to the invention, the counter is provided at one of its ends with a so-called bubble window indicated at 28 which is formed by drawing the end of the cylinder inwardly in the shape of a bubble and by this action reducing the thickness of the end wall to a few microns. For good results this thickness should not exceed ten microns, at which value 90% of the radiation is transmitted.

The envelope is filled at atmospheric pressure with one of the rare gases such as krypton or argon with which is mixed a small amount of petroleum ether or alcohol vapor. The function of the hydrocarbon vapor is to make the counter self-quenching and thus greatly shorten its resolving time. It also has the function of making possible the use of higher gas pressures without raising the threshold voltage above desirable levels, thus allowing efficient absorption in the gaseous filling of amounts of radiation such as are found in a diffracted X-ray beam.

The effect of these practices is to render the counter highly efficient when use is made of the gaseous absorption of the radiation rather than the photoelectric effect of the impact of radiation upon the cathode wall. Fig. 4 shows for various wavelengths, the percentages of absorption of radiation by krypton and argon at pressures of one atmosphere and at one-half atmosphere, in a counter 10 centimeters in length. It will be noted that the curve for each gas rises rapidly toward the high wavelengths, finally levelling off and then, as shown in the case of krypton, dropping abruptly to a new low level. If continued to the right, the curve for argon would also drop abruptly at a wavelength not shown. This point of discontinuity is called the critical absorption limit. The metals most usually used as X-ray targets are molybdenum and copper. The wavelength of the radiation from a molybdenum target is .7 angstrom unit, while that from copper is 1.5 units. Dotted line ordinates have been erected on the graph at these points, and it will be noted that each ordinate cuts the one atmosphere curve of one of the gases at a point of high absorption efficiency. Thus for a krypton filling about 93% of radiation from a molybdenum target entering the counter will be absorbed in a length of 10 centimeters, whereas for an argon filling about 87% from a copper target will be absorbed in the same distance of travel. The selection of a gas-vapor mixture and a filling pressure such that absorption of substantially all of the radiation from the target being used, will take place in the gas-vapor mixture within the length of the tube, is of course necessary to the successful operation of a Geiger-Muller counter in accordance with the invention. For best results a filling of krypton should be selected for use with a molybdenum target and a filling of argon for use with a copper target.

The selection of a gas filling as indicated by Fig. 4 and the use of the counter in such a manner that substantially all the radiation is absorbed by the gas-vapor mixture causes the counter to act as its own filter since the absorption of radiation of wavelengths remote from the target wavelength is greatly reduced. Thus the effects of background radiation are largely overcome.

In Fig. 3 is shown schematically, by way of example, apparatus suitable for carrying out the method of the invention. The apparatus is similar to that shown in Fig. 1 with the major difference lying in the substitution for the ionization chamber of a counter constructed according to the invention. As before, radiation from a target 10 is directed onto the material to be tested. If, instead of a single crystal as shown in Fig. 1, a specimen 30 of powder is employed as here shown, the radiation from the the target is not collimated but is passed through a single slitted plate 31 so that a beam of rays falls upon the specimen 30. The rays leaving the specimen 30 are likewise not collimated but passed through a single slitted plate 32 and into the counter 33 along its axis. The constructional details of the counter are the same as shown in Fig. 2.

By way of example a suitable means for synchronously indicating the azimuthal position of the arm 18 and the intensity of response of the counter is shown in Fig. 3. A portion of the edge of table 13 is provided with teeth 40 and a worm 41 meshing therewith is driven through a flexible shaft 42 by a motor 43. The motor 43 also drives the tape of a recorder 44 through a system of shafts and gears indicated at 45. The output of counter circuit 46, of conventional form, is utilized to actuate stylus 47 of pen recorder 48.

Fig. 5 shows a silver powder diffraction pattern obtained with a Geiger-Muller counter constructed and employed according to the invention. This curve was run in about 1/100 the time required for photographic registration of the pattern on the same apparatus. The upper numbers at the peaks of the curve indicate the relative intensities of the counter measured lines, the lower numbers at these points indicating, for comparison, the intensities determined by photographic comparison methods developed by Hanawalt, Rinn and Frevel and described in Industrial and Engineering Chemistry, vol. 10, p. 457, of 1938. The accuracy and speed of the counter are readily apparent from this figure.

A micro-photometer trace of the pattern of the same silver sample showed diffuse peaks superimposed on a large background of scattered intensity in marked contrast to the sharp peaks of the counter measured pattern with its very low background.

A counter constructed and used according to the invention may be employed in back reflection and other arrangements. In cases where its size would appear to offer difficulty, its sensitivity permits the expansion of the dimensions of the diffraction set-up to accommodate it.

Since any degree of precision may be obtained by counting for a sufficiently long time, the use of the counter opens up possibilities of measuring accurately the weakest diffraction lines, for example, those found in superstructure patterns.

The invention described herein may be manufactured and used by or for the Government of the United States of America for governmental purposes without the payment of any royalties thereon or therefor.

I claim:

1. The method of determining the intensity of radiation in an X-ray diffraction pattern by the use of a Geiger-Muller counter which comprises, directing the diffracted beams of radiation successively into said counter along paths which are substantially parallel to the longitudinal axis thereof.

2. The method of determining the intensity of radiation in an X-ray diffraction pattern by the use of a Geiger-Muller counter which comprises, directing the diffracted beams of radiation successively into said counter along paths oriented to give the entrant radiation comprising a diffracted beam along longitudinal gas path whereby the radiation is substantially completely absorbed in the gaseous filling of the counter.

3. The method of determining the intensity of radiation in an X-ray diffraction pattern by the use of a Geiger-Muller counter which comprises, directing a beam of X-radiation upon a specimen in which a manner that said beam is diffracted, positioning the counter to receive diffracted radiation along a path parallel to its longitudinal axis, rotating said specimen about an axis and rotating said counter about said axis of rotation in a manner to maintain unchanged the relation between said counter and said diffracted beam.

4. The method of determining the intensity of radiation in an X-ray diffraction pattern by the use of a Geiger-Muller counter which comprises, directing a beam of X-radiation upon a specimen in such a manner that said beam is diffracted, positioning the counter to receive diffracted radiation entrant in a direction parallel to the longitudinal axis of the counter, rotating said specimen about an axis, rotating said counter about said axis of rotation in a manner to maintain unchanged the relation between said counter and said diffracted beam and synchronously indicating the azimuthal position and the intensity of response of said counter.

5. A device for determining the intensity of radiation in an X-ray diffraction pattern which comprises, means mounting a specimen for rotation about an axis, means directing a beam of radiation upon said specimen in a manner to produce a diffracted beam of radiation, a Geiger-Muller counter, means mounting said counter for rotation about said axis, said counter being mounted with its longitudinal axis intersecting said first mentioned axis and means rotating said specimen and said counter about said first mentioned axis, the relative positions and rates of movement of said specimen and said counter being so synchronized as to maintain said diffracted beam directed into said counter along paths parallel to its axis throughout said rotation.

6. A device for determining the intensity of radiation in an X-ray diffraction pattern which comprises, means mounting a specimen for rotation about an axis, means directing a beam of radiation upon said specimen in a manner to produce a diffracted beam of radiation, a Geiger-Muller counter, means mounting said counter for rotation about said axis, said counter being mounted with its longitudinal axis intersecting said first mentioned axis, and means synchronously indicating the azimuthal position and the intensity of response of said counter.

7. A device for determining the intensity of radiation in an X-ray diffraction pattern which comprises, means mounting a specimen for rotation about an axis, means directing a beam of radiation upon said specimen in a manner to produce a diffracted beam of radiation, a Geiger-Muller counter, a mixture of a rare gas of the group comprising argon and krypton and a hydrocarbon vapor of the group comprising alcohol and petroleum ether filling said counter said mixture being so selected that at the pressure existing within said counter substantially all the radiation being measured and entering said counter in a direction parallel to the axis of said cathode will be absorbed in said filling, means mounting said counter for rotation about said axis, said counter being mounted with its longitudinal axis intersecting said first mentioned axis and means rotating said specimen and said counter about said first mentioned axis, the relative positions and rates of movement of said specimen and said counter being so synchronized as to maintain said diffracted beam directed into said counter along paths parallel to its axis throughout said rotation.

8. A Geiger-Muller counter adapted for use in measuring the intensity of radiation in an X-ray diffraction pattern, said counter comprising a cylindrical cathode, an anode wire extending along the axis of said cathode, a radiation permeable envelope hermetically enclosing said electrodes, and a filling of a mixture of a rare gas of the group comprising argon and krypton and an organic vapor of the group comprising alcohol and petroleum ether, said rare gas filling having its critical absorption limit at a wavelength higher than that of the radiation to be measured by the counter.

9. A Geiger-Muller counter adapted for use in measuring the intensity of radiation in an X-ray diffraction pattern, said counter comprising a cylindrical cathode, an anode wire extending along the axis of said cathode, an envelope hermetically enclosing said electrodes, said envelope having a generally cylindrical shape having its lateral walls substantially parallel to the walls of said cathode, a radiation permeable window in one end of said envelope, and a filling of a mixture of a rare gas of the group comprising argon and krypton and an organic vapor of the group comprising alcohol and petroleum ether, said rare gas filling having its critical absorption limit at a wavelength higher than the wavelength of the entrant radiation, thereby accomplishing substantially complete absorption of the radiation within the length of the counter.

10. A device for determining the intensity of radiation in an X-ray diffraction pattern which comprises, means mounting a specimen for rotation about an axis, means directing a beam of radiation upon said specimen in a manner to produce a diffracted beam of radiation, a Geiger-Muller counter, said counter comprising a cylindrical cathode, an anode wire extending along the axis of said cathode, an envelope hermetically enclosing said electrodes, a radiation permeable window at one end of said counter, and a mixture of a rare gas of the group comprising argon and krypton and a hydrocarbon vapor of the group comprising alcohol and petroleum ether filling said counter, said mixture being so selected that at the pressure existing within said counter substantially all the radiation being measured and entering said counter in a direction parallel to the axis of said cathode will be absorbed in said filling, means mounting said counter for rotation about said axis, said counter being mounted with its longitudinal axis intersecting said axis of rotation and said window end directed toward said axis of rotation and means rotating said specimen and said counter about said axis of rotation, the relative positions and rates of movement of said specimen and said counter being so synchronized as to maintain said diffracted beam directed into said counter along paths parallel to its axis throughout said rotation.

11. A device for determining the intensity of radiation in an X-ray diffraction pattern which comprises, means mounting a specimen for rotation about an axis, means directing a beam of radiation upon said specimen in a manner to produce a diffracted beam of radiation, a Geiger-Muller counter, said counter comprising a cylindrical cathode, an anode wire extending along the axis of said cathode, an envelope hermetically enclosing said electrodes, a radiation permeable window at one end of said counter, and a mixture of a rare gas of the group comprising argon and krypton and a hydrocarbon vapor of the group comprising alcohol and petroleum ether filling said counter, said mixture being so selected that at the pressure existing within said counter substantially all the radiation being measured and entering said counter in a direction parallel to the axis of said cathode will be absorbed in said filling, means mounting said counter for rotation about said axis, said counter being mounted with its longitudinal axis intersecting said axis of rotation and said window end directed toward said axis of rotation, and means synchronously indicating the azimuthal position and the intensity of response of said counter.

12. A Geiger-Muller counter adapted for use in measuring the intensity of radiation in an X-ray diffraction pattern, said counter comprising a cylindrical cathode, an anode wire extending along the axis of said cathode, an envelope hermetically enclosing said electrodes, a radiation permeable window in said envelope so positioned as to admit radiation moving in a direction parallel to the axis of said cathode and a filling of a mixture of a rare gas of the group comprising argon and krypton and an organic vapor of the group comprising alcohol and petroleum ether, said filling being selected and having its pressure related to the length of the counter to produce substantially complete absorption of entrant radiation in the length of the counter.

13. A Geiger-Muller counter adapted for use in measuring the intensity of radiation in an X-ray diffraction pattern, said counter comprising a cylindrical cathode, an anode wire extending along the axis of said cathode, an envelope hermetically enclosing said electrodes, and a filling of a mixture of a rare gas of the group comprising argon and krypton and a hydrocarbon vapor of the group comprising alcohol and petroleum ether, said filling being selected and having its pressure related to the length of the counter to absorb substantially all longitudinally entrant radiation in the length of the counter.

14. A Geiger-Muller counter adapted for use in measuring the intensity of radiation in an X-ray diffraction pattern, said counter comprising a cylindrical cathode, an anode wire extending along the axis of said cathode, an envelope hermetically enclosing said electrodes, and a filling of a mixture of a rare gas and a hydrocarbon vapor, said mixture being selected and its pressure adjusted to cause substantially all the radiation being measured and entering said counter in a direction parallel to the axis of said cathode to be absorbed in said filling in the length of the counter.

15. A device for determining the intensity of radiation in an X-ray diffraction pattern which comprises, means mounting a specimen for rotation about an axis, means directing a beam of radiation upon said specimen in a manner to produce a diffracted beam of radiation, a Geiger-Muller counter, said counter comprising a cylindrical cathode, an anode wire extending along the axis of said cathode, an envelope hermetically enclosing said electrodes, and a mixture of a rare gas and a hydrocarbon vapor filling said counter, said mixture being selected and its pressure adjusted to cause substantially all the radiation being measured and entering said counter in a direction parallel to the axis of said cathode to be absorbed in said filling in the length of the counter, means mounting said counter for rotation about said axis, said counter being mounted with its longitudinal axis intersecting said axis of rotation, and means synchronously indicating the azimuthal position and the intensity of response of said counter.

16. A device for determining the intensity of radiation in an X-ray diffraction pattern which comprises, means mounting a specimen for rotation about an axis, means directing a beam of radiation upon said specimen in a manner to produce a diffracted beam of radiation, a Geiger-Muller counter, a mixture of a rare gas and a hydrocarbon vapor filling said counter, said mixture being selected and its pressure adjusted to cause substantially all the radiation being measured and entering said counter in a direction parallel to the axis of said cathode to be absorbed in said filling in the length of the counter, means mounting said counter for rotation about said axis, said counter being mounted with its longitudinal axis intersecting said first mentioned axis and means rotating said specimen and said counter about said first mentioned axis, the relative positions and rates of movement of said specimen and said counter being so synchronized as to maintain said diffracted beam directed into said counter along paths parallel to its axis throughout said rotation.

HERBERT FRIEDMAN.

CERTIFICATE OF CORRECTION.

Patent No. 2,386,785. October 16, 1945.

HERBERT FRIEDMAN.

It is hereby certified that error appears in the printed specification of the above numbered patent requiring correction as follows: Page 3, first column, line 66, claim 2, for the word "along" read --a long--; line 73, claim 3, for "which" read --such--; and that the said Letters Patent should be read with this correction therein that the same may conform to the record of the case in the Patent Office.

Signed and sealed this 15th day of January, A. D. 1946.

Leslie Frazer (Seal)   First Assistant Commissioner of Patents.

16. A device for determining the intensity of radiation in an X-ray diffraction pattern which comprises, means mounting a specimen for rotation about an axis, means directing a beam of radiation upon said specimen in a manner to produce a diffracted beam of radiation, a Geiger-Muller counter, a mixture of a rare gas and a hydrocarbon vapor filling said counter, said mixture being selected and its pressure adjusted to cause substantially all the radiation being measured and entering said counter in a direction parallel to the axis of said cathode to be absorbed in said filling in the length of the counter, means mounting said counter for rotation about said axis, said counter being mounted with its longitudinal axis intersecting said first mentioned axis and means rotating said specimen and said counter about said first mentioned axis, the relative positions and rates of movement of said specimen and said counter being so synchronized as to maintain said diffracted beam directed into said counter along paths parallel to its axis throughout said rotation.

HERBERT FRIEDMAN.

CERTIFICATE OF CORRECTION.

Patent No. 2,386,785.   October 16, 1945.

HERBERT FRIEDMAN.

It is hereby certified that error appears in the printed specification of the above numbered patent requiring correction as follows: Page 3, first column, line 66, claim 2, for the word "along" read --a long--; line 73, claim 3, for "which" read --such--; and that the said Letters Patent should be read with this correction therein that the same may conform to the record of the case in the Patent Office.

Signed and sealed this 15th day of January, A. D. 1946.

Leslie Frazer (Seal)   First Assistant Commissioner of Patents.